United States Patent
Koefod

(10) Patent No.: US 7,655,153 B2
(45) Date of Patent: Feb. 2, 2010

(54) DEICER COMPOSITIONS INCLUDING CORROSION INHIBITORS FOR GALVANIZED METAL

(75) Inventor: Robert Scott Koefod, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 11/588,958

(22) Filed: Oct. 27, 2006

(65) Prior Publication Data

US 2008/0099716 A1 May 1, 2008

(51) Int. Cl.
*C09K 3/18* (2006.01)

(52) U.S. Cl. .......................................... 252/70; 106/13
(58) Field of Classification Search .................... 106/13; 252/70
See application file for complete search history.

(56) References Cited

U.S. PATENT DOCUMENTS

| | | | |
|---|---|---|---|
| 3,711,246 A | 1/1973 | Foroulis | |
| 5,350,533 A * | 9/1994 | Hubred et al. | 252/70 |
| 5,435,930 A * | 7/1995 | Chan et al. | 508/145 |
| 5,531,931 A * | 7/1996 | Koefod | 252/387 |
| 6,596,189 B1 * | 7/2003 | Moles et al. | 252/70 |
| 6,800,217 B2 * | 10/2004 | Koefod et al. | 252/70 |
| 7,100,760 B2 * | 9/2006 | Hoerle et al. | 198/625 |
| 7,138,071 B2 * | 11/2006 | Sapienza et al. | 252/70 |
| 7,147,797 B2 * | 12/2006 | Koefod et al. | 252/70 |
| 2003/0034478 A1 * | 2/2003 | Stanley et al. | 252/70 |
| 2003/0146408 A1 * | 8/2003 | Moles et al. | 252/70 |
| 2003/0168625 A1 * | 9/2003 | Sapienza et al. | 252/70 |
| 2005/0017215 A1 * | 1/2005 | Koefod et al. | 252/70 |
| 2005/0230658 A1 * | 10/2005 | Koefod | 252/70 |
| 2006/0202156 A1 * | 9/2006 | Sapienza et al. | 252/70 |

FOREIGN PATENT DOCUMENTS

| | | |
|---|---|---|
| DE | 40 34 217 | 5/1991 |
| WO | WO 2005/071036 | 8/2005 |

* cited by examiner

*Primary Examiner*—Anthony J Green

(57) ABSTRACT

A deicing composition with a carboxylate salt as the primary deicer and that has a low corrosivity to galvanized steel is disclosed. The composition includes a soluble silicate as a corrosion inhibitor and a gluconate salt as a silicate stabilizer to maintain adequate solubility of the silicate salt at pH values below about 11.5.

18 Claims, No Drawings

DEICER COMPOSITIONS INCLUDING CORROSION INHIBITORS FOR GALVANIZED METAL

REFERENCE TO RELATED APPLICATIONS

This application is related to the U.S. patent application Ser. No. 11/041,000, filed Jan. 21, 2005, which claims the benefit of Provisional Application Nos. 60/538,060, filed Jan. 21, 2004; 60/571,061, filed May 14, 2004; 60/580,434, filed Jun. 17, 2004; and 60/641,651, filed Jan. 5, 2005. All of the afore-mentioned provisional and non-provisional applications are incorporated by reference herein in their entirety.

FIELD OF THE INVENTION

The present invention is directed to improved deicer compositions including corrosion inhibitors for deicing applications, in particular deicer compositions that will be exposed to, or come in contact with, galvanized steel.

BACKGROUND

Chloride salts, and particularly sodium chloride, are commonly used deicers for many highway winter maintenance applications due to the low cost of the salts. However, the chloride ion is very corrosive to a variety of metals, especially to mild steel. Thus, in areas that are particularly sensitive to corrosion, it is often desirable to use a non-chloride deicer. Examples of commonly used non-chloride deicers include carboxylate salts such as sodium acetate, sodium formate, calcium magnesium acetate, and potassium acetate. Because these chemicals contain no chloride, they are far less corrosive to the variety of metals and alloys in aircrafts and are therefore the preferred deicers for airport runways, where chlorides cannot be tolerated. Liquid potassium acetate in particular is a very popular runway deicer for airport runways. Potassium acetate has been shown to have acceptably low corrosion towards the metals specified by the SAE Standard AMS 1435A for liquid runway deicers, including aluminum alloys, anodized aluminum alloys, magnesium alloys, titanium alloys, mild steel, and low embrittling cadmium plate.

While potassium acetate is adequately non-corrosive to the metals specified in AMS 1435A, it and the other carboxylate salt deicers are extremely corrosive towards zinc and galvanized steel. This often renders the use of potassium acetate in many areas, including airport runways, undesirable. Airports often have large investments in galvanized steel structures, such as runway lights, for runways. In order to avoid galvanized steel corrosion, airports often use propylene glycol rather than potassium acetate. Propylene glycol is not as corrosive towards galvanized steel but has certain disadvantages compared to carboxylate salt deicers. For example, propylene glycol is less environmentally friendly, having a much higher biological oxygen demand than potassium acetate.

There is therefore a need for an improved salt deicer with reduced corrosiveness towards zinc and galvanized steel than the conventional carboxylate salt deicers.

SUMMARY

The embodiments of the invention described herein include improved carboxylate salt deicers with minimized corrosion to galvanized steel and zinc. The formulas comprise an effective amount (e.g., 30-75% or 40-50% by weight) of a carboxylate salt as the primary deicing chemical (such as the sodium, potassium, calcium, magnesium, or ammonium salts of formate, acetate, propionate, and lactate, or mixtures thereof), a gluconate salt, such as sodium gluconate (1% to 20%, or 3 to 15% or 5 to 10%), and a soluble silicate salt.

DETAILED DESCRIPTION OF THE INVENTION

New, corrosion inhibited deicer formulas have been developed based upon potassium acetate with greatly reduced corrosiveness to galvanized steel. Selection of the appropriate corrosion inhibitor for a given application is highly dependent upon the corrosion environment, including such factors as the predominant chemical in solution, the metal to be protected, and exposure conditions. Thus, that a given corrosion inhibitor is effective for a given metal and a given chemical does not automatically lead to a conclusion that the same corrosion inhibitor will also be effective for different chemicals and/or different metals. For example, it is well know that phosphate salts are very effective at inhibiting the corrosion of sodium chloride to mild steel. However, phosphate salts are very poorly effective at inhibiting the corrosion of galvanized steel by potassium acetate.

Tests by the inventor have shown that soluble silicate salts are excellent corrosion inhibitors for potassium acetate and galvanized steel. Silicates have been mentioned as corrosion inhibitors for potassium acetate in the past, but primarily for metals other than zinc and galvanized steel. Dietl et. al. (U.S. Pat. No. 6,955,770) describes the addition of 0.001% to 1% by weight of a corrosion inhibitor selected from phosphates, silicates, and borates, although no mention is made of what specific types of metals these are intended to protect. Tests by the inventor have shown that borates and phosphates are poor corrosion inhibitors for potassium acetate and galvanized steel. Tests by the inventor have also shown that silicates are very effective corrosion inhibitors for potassium acetate and galvanized steel, but only at concentrations that result in pH values that exceed the maximum pH permitted for runway deicers.

For example, runway deicers in the U.S. must meet the AMS 1435A specifications, which require liquid runway deicers to have a pH between 7.0 and 11.5. Water soluble silicates generally require a pH>12 to be stable in aqueous solution. Therefore, even at the maximum pH allowed for airport runway deicers, it is impossible to maintain a sufficient concentration of silicate in solution to be acceptable as a corrosion inhibitor for galvanized steel. Effective corrosion inhibition of potassium acetate towards galvanized steel requires a minimum of about 0.10% sodium metasilicate (~45-47% $SiO_2$) and preferably ≧0.15% sodium metasilicate in solution. When 0.2% sodium metasilicate is dissolved in liquid potassium acetate, the pH of the resulting solution is >12.5, far in excess of the maximum allowed by AMS 1435A. When acid is added to reduce the pH to 11.5, most of the silicate immediately precipitates from solution, and the final mixture is poorly effective at inhibiting the corrosion of galvanized steel. Thus, Dietl does not disclose or suggest that a potassium acetate liquid with an acceptably low corrosion rate for galvanized steel could be formulated using silicates as the corrosion inhibitor.

Moles et. al. (U.S. Pat. No. 6,596,189) describe a carboxylate salt deicer formula comprising 0.01% to 1.0% silicate and phosphate salt. The corrosion requirements described for this formula are those of AMS 1435 and of carbon-carbon composite brake systems, both of which are very different from zinc and galvanized steel. Moles et. al. does not disclose a silicate-based potassium acetate formula that would be effective in inhibiting the corrosion of galvanized steel while meeting the AMS 1435A standards.

Chan et. al. (U.S. Pat. No. 5,435,930) describes a potassium acetate formula comprising at least 800 ppm phosphate ion and at least about 150 ppm silicate. The corrosion mentioned is specifically the corrosion needed for the protection of aircraft and in particular the corrosion requirements of the AMS 1435 standard. There is no disclosure or suggestion in Chan et al. that silicate can be effective against corrosion of galvanized steel.

As mentioned above, maintaining a suitably high concentration of silicate in solution at the pH values permitted by AMS 1435 results in an effective potassium acetate liquid with low corrosion to galvanized steel. The inventor has discovered that silicates may be stabilized in solution at lower pH by sodium gluconate. In the presence of an adequate concentration (for example, about 5%) a gluconate salt such as sodium gluconate, it is possible to maintain a sufficient concentration of silicate in solution to obtain excellent corrosion inhibition of galvanized steel.

In some embodiments of the invention, a deicer composition comprises an effective amount of a carboxylate salt as the primary deicing chemical in a water solution. Suitable carboxylate salts include sodium, potassium, calcium, magnesium, or ammonium salts of formate, acetate, propionate or lactate, or mixtures thereof. Various concentrations of the carboxylate salt can be used. For example, a concentrations of about 30-75%, or 40-50% by weight, can be used.

The deicer composition in these embodiments further comprises a gluconate salt, such as sodium gluconate. Other gluconate salts, such as, potassium gluconate, magnesium gluconate and calcium gluconate, can also be used. Various concentrations can be used. Examples include about 1-20%, 5-15%, or 7-9%.

The deicer composition in these embodiments further comprises a soluble silicate salt. Suitable silicate salts include sodium and potassium orthosilicate, metasilicate, polysilicate, and pyrosilicate. Sodium metasilicate or sodium metasilicate pentahydrate may be used. Suitable silicate salts can be selected from the group of sodium silicates with ratios of SiO2:Na2O ranging from less than 0.5 to 3.85. Sodium metasilicate (Na2SiO3) containing 45-47% SiO2 can be used and can be present at about 0.01% to 1.0%, 0.05% to 0.50% or 0.10% to 0.40%. Some soluble silicate salts are commercially available in a variety of forms with different ratios of SiO2 and alkaline earth oxide and are often generally referred to as "water glass." A soluble silicate salt can be added to provide a concentration of silicate that contains the equivalent of 45 to 4500 ppm SiO2, or 225 to 2250 ppm SiO2, or 400 to 2000 ppm SiO2.

EXAMPLES

Example 1 shows corrosion test results on some potassium acetate formulas. Corrosion tests were run according to a test method provided by the Chicago O'Hare International Airport: Test solutions were 20% by volume dilutions of the liquid deicer in deionized water. Test coupons were hot dip galvanized steel (1010 steel) washers (1.25 inch outer diameter, 0.5 inch inner diameter, 0.063 inch thick). Two pre-weighed test coupons were mounted on a plastic rack and suspended by monofilament through a one hole rubber stopper loosely fitted on the top of an Erlenmeyer flask containing 346 mL of test solution. The coupons were completely immersed in the test solution for 10 minutes and then raised so they were suspended above the solution within the flask for 50 minutes. This cycle of 10 minutes immersion followed by 50 minutes suspension above the solution was repeated for 168 hours. At the end of the exposure time, the coupons were cleaned to remove corrosion products and reweighed. Corrosion rates were calculated from the measured coupon weight loss. Throughout this application, including the claims, all numerical values of corrosion rates shall be the corrosion rates measured by the test method described in this paragraph. All measurements refer to measurements at room temperature.

In the formulas below, $Na_2SiO_3$ refers to sodium metasilicate with a $SiO_2$ content of about 45-47%. Solutions containing silicate and having pH<13 were adjusted to the given pH by adding acetic acid.

Example 1

Corrosion Rates of Galvanized Steel

| Formula | Corrosion Rate (mils per year) |
| --- | --- |
| Rain Water Control | 1.8 |
| 50% Potassium Acetate | 55.5 |
| 50% Potassium Acetate, 5.0% sodium gluconate 0.085% $Na_2SiO_3$, | 8.6 |
| 50% Potassium Acetate, 5.0% sodium gluconate 0.125% $Na_2SiO_3$, | 3.0 |
| 50% Potassium Acetate, 5.0% sodium gluconate 0.125% $Na_2SiO_3$, | 3.0 |
| 50% Potassium Acetate, 5.0% sodium gluconate 0.20% $Na_2SiO_3$, | 0.6 |
| 50% Potassium Acetate, 5.0% sodium gluconate | 9.6 |

The data in Example 1 shows that rain water results in a galvanized corrosion rate of approximately 2 mils per year. Compared to this, standard liquid potassium acetate, which is generally sold as a 50% solution for runway deicing, is highly corrosive to galvanized steel, with a corrosion rate well in excess of 50 mils per year. The corrosion rate of rain water sets a desirable level of the corrosion rate of a preferred liquid potassium acetate deicer formula. Data indicates that sodium gluconate alone is a moderately effective corrosion inhibitor for galvanized steel, reducing the corrosion rate by about 83%. Thus, in some applications sodium gluconate alone can be used as a galvanized steel corrosion inhibitor for potassium acetate. However, a preferred formulation will have a corrosion rate near to or less than that of water. Table 1 shows that at levels of about 0.1% to 0.2% sodium metasilicate (or an equivalent of about 450 to 900 ppm soluble $SiO_2$), it is possible to lower the corrosion rate to near or below that of rain water.

It is often desirable to add tolyltriazole or the sodium salt of tolyltriazole to liquid potassium acetate as a corrosion inhibitor to enable it to meet the AMS 1435A hydrogen embrittlement corrosion requirement. GE Water and Process Technologies' Halogen Resistant Azole product (such as HRA AZ660) may also be used to inhibit hydrogen embrittlement corrosion Example 2 shows the results of tests to determine if tolyltriazole had any detrimental effect on the galvanized steel corrosion protection of the formula. All of the formulas in Example 2 were adjusted to pH 11.4 with acetic acid.

Example 2

Corrosion Rates of Galvanized Steel

| Formula | Corrosion Rate (mils per year) |
| --- | --- |
| 50% Potassium Acetate, 0% sodium tolyltriazole 0.20% Na$_2$SiO$_3$, | 1.7 |
| 50% Potassium Acetate, 0.05% sodium tolyltriazole 0.20% Na$_2$SiO$_3$, | 1.7 |
| 50% Potassium Acetate, 0.025% sodium tolyltriazole 0.20% Na$_2$SiO$_3$, | 1.2 |
| 50% Potassium Acetate, 0.20% HRA AZ660 0.20% Na$_2$SiO$_3$, | 1.5 |
| 50% Potassium Acetate, 0.10% HRA AZ660 0.20% Na$_2$SiO$_3$, | 1.7 |

The results in Example 2 indicate that addition of either tolyltriazole or Halogen Resistant Azole has no significant effect on the galvanized corrosion inhibition.

The importance of sodium gluconate to stabilize the silicate in the formula and the insufficiency of silicate by itself as a corrosion inhibitor in these formulas is illustrated by Example 3.

Example 3

Corrosion Inhibitor Effectiveness as a Function of Time

| Formula | Sample Age | pH | Corrosion Rate (mpy) |
| --- | --- | --- | --- |
| 50% Potassium Acetate, 0% sodium gluconate 0.20% Na$_2$SiO$_3$, 0.05% sodium tolyltriazole | 1 day | >13 | 0.6 |
| 50% Potassium Acetate, 0% sodium gluconate 0.20% Na$_2$SiO$_3$, 0.05% sodium tolytriazole | 4 weeks | 11.2 | 10.0 |
| 50% Potassium Acetate, 6% sodium gluconate 0.20% Na$_2$SiO$_3$, 0.05% sodium tolytriazole | 4 weeks | 11.1 | 2.3 |

When added to liquid potassium acetate, silicate salts slowly hydrolyze over time. Thus, when silicate is added alone to liquid potassium acetate, the pH drops over time. The sample containing 0.20% sodium metasilicate and no gluconate in liquid potassium acetate formed a large amount of precipitate within 3 weeks. By contrast, solutions containing 5% sodium gluconate formed only a slight amount of precipitate over the same period, while precipitation in solutions containing 7% sodium gluconate was negligible. The corrosion test results in Example 3 illustrate the importance of sodium gluconate in stabilizing the silicate corrosion inhibitor in extending the shelf life of formulations. Within 4 weeks, the corrosion inhibition effectiveness of a sample containing no gluconate decreased dramatically—galvanized corrosion rates rose from less than 1 mpy to 10 mpy. By contrast, a sample containing 6% sodium gluconate retained far more effectiveness after 4 weeks.

In some embodiments of the invention, the deicer can be produced as a single blended mixture. In other embodiments, the components of the formula are mixed on site just prior to use. For example, in an embodiment of this invention, a pre-blend of 5-7% sodium gluconate and about 50% potassium acetate is prepared, optionally with additional corrosion inhibitors such as tolyltriazole. The pre-mix is adjusted to a pH of approximately 9.0 to 9.3. This pre-mix can be stored and used as a liquid deicer in areas where galvanized steel corrosion is less critical. For areas where a very low galvanized steel corrosion is desired, a solution of sodium silicate can be mixed on site with the pre-mix of gluconate/potassium acetate liquid. The gluconate provides a unique buffering and stabilizing capacity for this application. If silicate is added to the potassium acetate without the gluconate present, an unacceptably high pH will result. However, a small amount of silicate solution may be easily blended with the pre-mixture described above to yield a final mixture that is stable to precipitation and which has a pH≦11.5 and will provide high corrosion inhibition of galvanized steel.

The invention has been described with reference to various specific and preferred embodiments and techniques. However, it should be understood that many variations and modifications may be made while remaining within the spirit and scope of the invention.

I claim:

1. A deicing composition comprising a water solution of:
   a carboxylate salt of a concentration of from about 30-75% by weight;
   a corrosion inhibitor comprising a soluble silicate salt; and
   a gluconate salt,
   wherein the soluble silicate salt is of a concentration sufficient to limit the corrosion rate of galvanized steel in contact with the solution to no more than about 10 mils per year, and
   wherein the gluconate salt is of a concentration of about 7-15% by weight and is sufficient to prevent precipitation of the silicate, and
   wherein the pH of the water solution is about 11.5 or lower.

2. The deicing composition of claim 1, wherein the carboxylate salt is selected from the group consisting of sodium, potassium, calcium, magnesium, and ammonium salts of formate, acetate, propionate or lactate, and combinations thereof.

3. The deicing composition of claim 1, wherein the soluble silicate salt is selected from the group consisting of sodium and potassium orthosilicate, metasilicate, polysilicate, and pyrosilicate, and combinations thereof.

4. The deicing composition of claim 1, wherein the gluconate salt comprises sodium gluconate.

5. The deicing composition of claim 4, wherein the carboxylate salt comprises potassium acetate, and wherein the soluble silicate salt comprises sodium metasilicate.

6. The deicing composition of claim 1, wherein the soluble silicate salt is of a concentration sufficient to limit corrosion rate of galvanized steel in contact with the solution to no more than about 2.0 mils per year.

7. The deicing composition of claim 1, wherein the carboxylate salt comprise potassium acetate of a concentration of about 40-50% by weight.

8. The deicing composition of claim 1, wherein the gluconate salt comprises sodium gluconate of a concentration of about 7-9% by weight.

9. A deicing composition, comprising a solution of:
   a carboxylate salt of a concentration of from about 30-75% by weight;

a corrosion inhibitor comprising a soluble silicate salt of a concentration sufficient to provide an equivalent of about 45 to about 4500 ppm by weight $SiO_2$ in the solution; and a gluconate salt of a concentration of from about 7-15% by weight and is sufficient to prevent precipitation of the silicate, and wherein the pH of the solution is about 11.5 or lower.

10. The deicing composition of claim 9, wherein the corrosion inhibitor comprising a soluble silicate salt of a concentration sufficient to provide an equivalent of about 225 to about 2250 ppm by weight $SiO_2$ in the solution.

11. The deicing composition of claim 10, wherein the corrosion inhibitor comprising a soluble silicate salt of a concentration sufficient to provide an equivalent of about 400 to about 2000 ppm by weight $SiO_2$ in the solution.

12. The deicing composition of claim 9, wherein the soluble silicate salt comprises sodium silicates with a ratio of $SiO_2$:$Na_2O$ of about 0.5-3.85.

13. The deicing composition of claim 9, wherein the soluble silicate salt comprises a sodium metasilicate ($Na_2SiO3$) containing about 45-47% SiO2 by weight.

14. The deicing composition of claim 13, wherein the sodium metasilicate is of a concentration of about 0.01% to 1.0%.

15. The deicing composition of claim 14, wherein the sodium metasilicate is of a concentration of about 0.05% to 0.50%.

16. The deicing composition of claim 15, wherein the sodium metasilicate is of a concentration of about 0.10% to 0.40%.

17. The deicing composition of claim 9, further comprising a tolyltriazole or a sodium salt of tolyltriazole.

18. A method of making a deicing composition, comprising mixing in a solution a carboxylate salt of a concentration of from about 30-75% by weight;

a corrosion inhibitor comprising a soluble silicate salt of a concentration sufficient to provide an equivalent of about 45 to about 4500 ppm by weight $SiO_2$ in the solution; and a gluconate salt of a concentration of from about 7-15% by weight and is sufficient to prevent precipitation of the silicate at a pH value of the solution of about 11.5 or lower;

wherein the mixing of the carboxylate salt and gluconate salt is carried out to produce a pre-mix before further mixing with the soluble silicate; and wherein the method further comprises:

storing the pre-mix separately from the soluble silicate;

transporting the pre-mix and soluble silicate to an application site;

mixing the pre-mix and the soluble silicate at the application site; and apply the deicing composition at the application site.

* * * * *

UNITED STATES PATENT AND TRADEMARK OFFICE
CERTIFICATE OF CORRECTION

| | |
|---|---|
| PATENT NO. | : 7,655,153 B2 |
| APPLICATION NO. | : 11/588958 |
| DATED | : February 2, 2010 |
| INVENTOR(S) | : Robert Scott Koefod |

It is certified that error appears in the above-identified patent and that said Letters Patent is hereby corrected as shown below:

In column 3, line 41, delete "SiO2:Na2O" and insert -- $SiO_2:Na_2O$ --, therefor.

In column 3, line 42, delete "(Na2SiO3)" and insert -- $(Na_2SiO_3)$ --, therefor.

In column 3, line 42, delete "SiO2" and insert -- $SiO_2$ --, therefor.

In column 3, line 45, delete "SiO2" and insert -- $SiO_2$ --, therefor.

In column 3, line 49, delete "SiO2" and insert -- $SiO_2$ --, therefor.

In column 3, line 49, before "2250 ppm" delete "SiO2" and insert -- $SiO_2$ --, therefor.

In column 3, line 50, delete "SiO2" and insert -- $SiO_2$ --, therefor.

In column 6, line 28, in Claim 1, before "from" delete "of".

In column 6, line 66, in Claim 9, before "from" delete "of".

In column 7, line 5, in Claim 9, before "from" delete "of".

In column 7, line 23, in Claim 13, delete "(Na2SiO3)" and insert -- $(Na_2SiO_3)$ --, therefor.

In column 8, line 2, in Claim 16, after "to" insert -- about --.

In column 8, line 7, in Claim 18, delete "solution" and insert -- solution: --, therefor.

In column 8, line 8, in Claim 18, before "from" delete "of".

In column 8, line 14, in Claim 18, before "from" delete "of".

Signed and Sealed this
Fifth Day of April, 2011

David J. Kappos
*Director of the United States Patent and Trademark Office*